Figure 1:
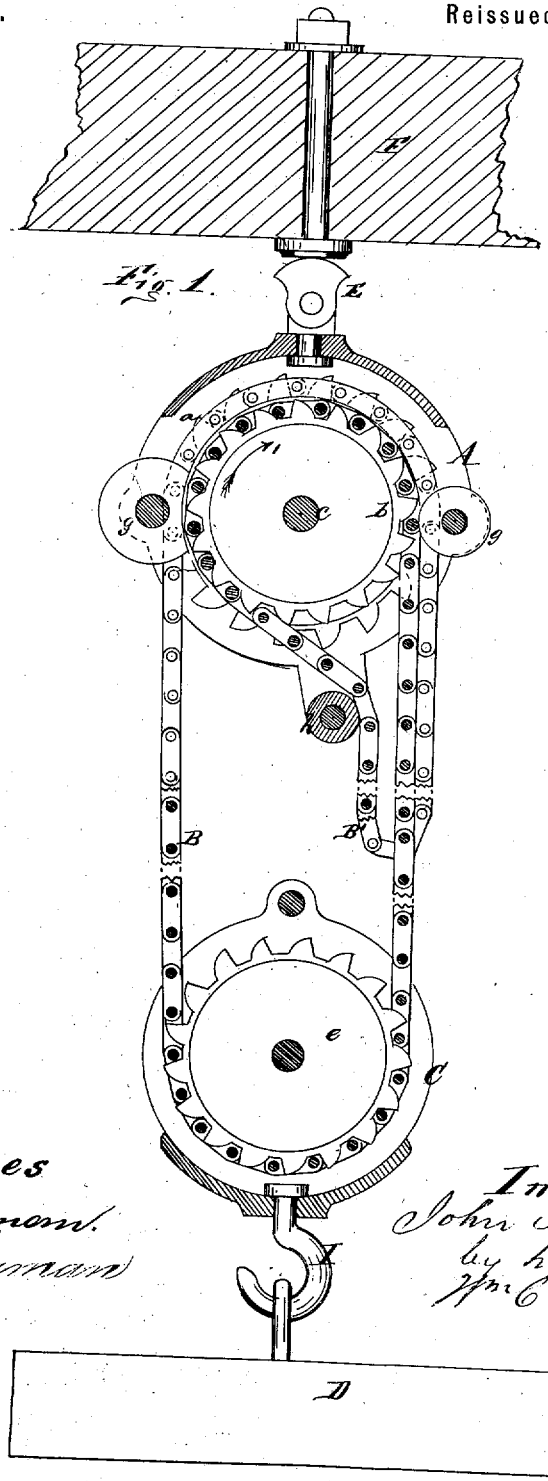

2 Sheets--Sheet 1.

J. J. DOYLE.

Hoisting Device.

No. 5,204. Reissued Dec. 24, 1872.

Witnesses
H. L. Benson.
Louis Seaman

Inventor
John James Doyle
by his Atty
Wm C Hicks

2 Sheets--Sheet 2.
J. J. DOYLE.
Hoisting Device.
No. 5,204.
Reissued Dec. 24, 1872.
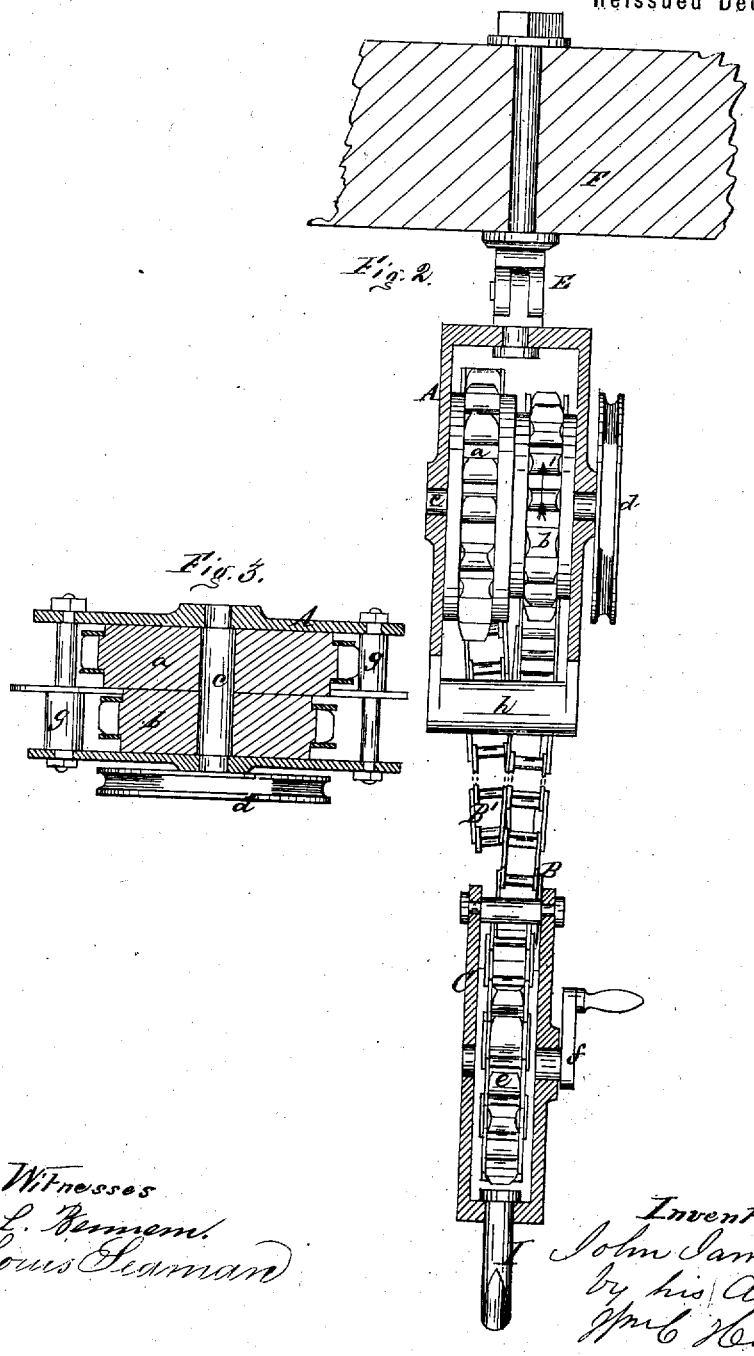
Witnesses
W. L. Bennem.
Louis Seaman
Inventor
John James Doyle
by his Atty
Wm C Hicks

UNITED STATES PATENT OFFICE.

JOHN JAMES DOYLE, OF NEW YORK, N. Y.

IMPROVEMENT IN HOISTING DEVICES.

Specification forming part of Letters Patent No. 31,077, dated January 8, 1861; reissue No. 5,204, dated December 24, 1872.

*To all whom it may concern:*

Be it known that I, JOHN JAMES DOYLE, of the city, county, and State of New York, made an invention of a new and Improved Hoisting Device; and I do hereby declare that the following is a full, clear, and exact description and specification of the same.

The object of this invention is to obtain a powerful, and at the same time a simple and compact hoisting device capable of general application, but more especially adapted to the lifting or hoisting of heavy weights. The invention consists of certain combinations of a differential-pulley sheave with other instrumentalities, whereby the desired end is obtained, and which are specified at the close of this schedule.

To enable those skilled in the art to fully understand and construct apparatus embodying my invention, I have represented in the accompanying drawing, and will proceed to describe, a set of differential-pulley blocks embodying it.

Figure 1 of said drawing is a side view of the said set of differential-pulley blocks, the sides of the shells of the blocks nearest the eye and a portion of one side of the chain being removed. Fig. 2 is an edge view of the same, the shells of the blocks being bisected centrally. Fig. 3 is a central section of the upper block of the same.

Similar letters of reference indicate corresponding parts in the several figures.

A represents a block in which two pulley-sheaves, *a b*, are placed and keyed on a common axis, *c*. The sheaves *a b* are toothed, but they are of different diameters, and consequently one has more teeth than the other, the difference in the number of teeth corresponding to the difference in the diameters of the sheaves, the teeth of both sheaves being, of course, of the same size. The said two sheaves of different diameters, made fast to each other, constitute a differential-pulley sheave; and this sheave and the shell of the block constitute a differential-pulley block. The axis *c* extends through the shell of the block A, at one side thereof, so that an external sheave, *d*, may be placed on it. B is an endless chain which passes around the two pulley-sheaves *a b* in the block A and around a toothed sheave, *e*, in a single block, C, as shown clearly in Figs. 1 and 2. The axis of the sheave *e* may have a crank, *f*, attached to it, as shown in Fig. 2. To the block A there are attached two guide-rollers, the location of which in reference to the differential sheave is fixed, and therefore I call them stationary chain-guides *g g*, one opposite each of the sheaves *a b*, and an under roller, *h*, is also attached to the lower part of block A. The functions of these rollers will be presently described. The links of the chain B fit the teeth of the differential-pulley sheave *a b*, so that all slipping is effectually prevented. The weight or article D to be hoisted is attached to the single block C, a swivel-hook, I, being connected with the frame of the lower block for that purpose, and in order that the article hoisted may be turned to any desired position. To the upper block A is fitted a swivel, E, by which the whole apparatus may be suspended from any suitable or convenient support F, with the capacity of being turned to any position which may be required.

The operation is as follows: The pulley-sheave *d* of the upper block A or the sheave *e* of the lower block C may be rotated by any convenient power applied either to the rope on the sheave *d* or to the slack loop of chain between the two pulley-blocks, or to the crank of the lower block, and at every revolution of the differential-pulley sheave *a b* in a direction from left to right, (as indicated by the arrow 1,) the lower block C with its weight D will be elevated a space or distance equivalent to half the difference between the effective circumferences of the two sheaves *a b* at the positions of the mean lines of the chain upon them. If, for instance, the larger sheave *a* has seventeen teeth and the smaller sheave *b* sixteen teeth, the block C will be elevated vertically a space equal to half the distance between the centers of two teeth at the mean line of the chain on the sheave; and if the power be applied to the slack chain depending from the sheave *a*, it will be multiplied about thirty-four times in being transmitted to the weight D through the medium of the chain and pulley-sheaves. The power and speed may, of course, be varied by having the diameters of the sheaves *a b* vary more or less in relation with each other. The rollers *g g* serve as guides to prevent the chain from disengaging from the differential sheave, and the roller *h* serves as a guide to keep the slack portion B′ of the chain out of the path of the movement of the lower block C. By reversing the movement of the pulleys the weight D, of course, will descend.

I do not confine myself to toothed pulleys, for equivalent devices may be used—as, for example, pulleys with embedded spaces or sectional stops may be used in order to secure a firm and sufficient grip or hold of the chain or chain-band in all positions during the elevation, suspension, or descent of the load.

This invention may be used for lifting loads through short spaces, and the "slack" B′ of the chain B may be attached to the barrel or roller of any windlass or hoisting-gin for the purpose of increasing the power or convenience in the working of the same.

What I claim as new, and desire to secure by Letters Patent, is—

1. The combination of the differential-pulley sheave, the shell of the block, and a stationary chain-guide for holding the chain to the said sheave, substantially as before set forth.

2. The combination of the differential-pulley sheave, the shell of the block, and two guides arranged at opposite sides of the differential-pulley sheave, substantially as before set forth.

3. The combination of the shell of the block and the differential-pulley sheave, a stationary chain-guide, and a swivel for suspending the same, substantially as before set forth.

4. The combination of the differential-pulley sheave, the shell of the block, and the external sheave, substantially as before set forth.

5. The combination of the differential-pulley sheave, the shell of the block, and the under guide for the slack chain, substantially as before set forth.

6. The combination, substantially as before set forth, of the following instrumentalities, viz: the differential-pulley block with stationary chain-guide, the single block and its swivel-hook, the endless chain, and the swivel of the differential-pulley block, through which swivel the whole apparatus is supported.

In testimony whereof I have hereto set my hand.

JOHN JAMES DOYLE.

Witnesses:

LOUIS SEAMAN,
WM. C. HICKS.